UNITED STATES PATENT OFFICE.

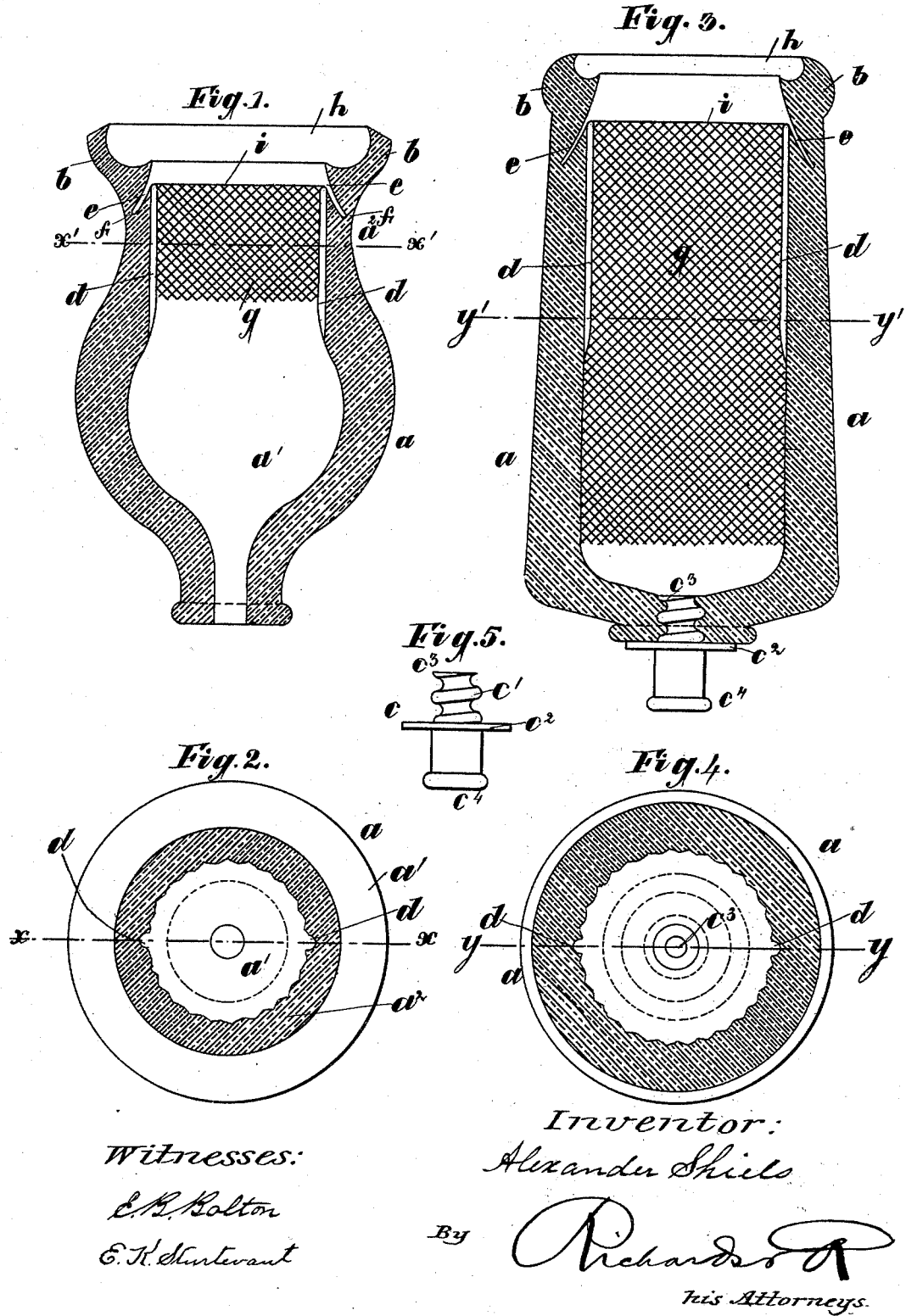

ALEXANDER SHIELS, OF GLASGOW, SCOTLAND.

TEAT-CUP FOR MILKING-MACHINES.

SPECIFICATION forming part of Letters Patent No. 524,738, dated August 21, 1894.

Application filed March 7, 1894. Serial No. 502,744. (No model.) Patented in England March 2, 1893, No. 4,558.

*To all whom it may concern:*

Be it known that I, ALEXANDER SHIELS, a subject of the Queen of Great Britain, and a resident of the city of Glasgow, Scotland, have invented certain new and useful Improvements in Teat-Cups for Milking-Machines, (for which I have obtained Letters Patent in Great Britain, dated March 2, 1893, No. 4,558,) of which the following is a specification.

This invention relates to teat cups for use in connection with milking machines, and it has for its object to improve their construction, and, at the same time, render them more natural and efficient in their action.

In order that my said invention may be properly understood I have hereunto appended an explanatory sheet of drawings, whereon—

Figure 1 is a vertical section of a teat cup on the line $x$—$x$ of Fig. 2, and Fig. 2 is a cross section on the line $x'$—$x'$ Fig. 1. Fig. 3 is a vertical section of a modified form of the teat cup on the line $y$—$y$ Fig. 4 and Fig. 4 is a cross section in the line $y'$—$y'$, Fig. 3. Fig. 5 is a view of a nipple.

Reference is made to the drawings whereon the same reference letters wherever repeated indicate the same parts.

In carrying out my present invention, I prefer to make the teat cup $a$ of india-rubber, or similar elastic material, throughout. The rubber may be molded as shown at Figs. 1 and 2, into the form, in outside view, of a Scotch thistle, *i. e.*, it has a lower expanded part $a'$ of bulb formation, with a narrow neck $a^2$ on which is supported an expanded rim or beading $b$. This rim or beading grips, when the teat cup is fitted in place, the root of the cow's teat. The tube leading from the vacuum apparatus and milk receptacle, is connected to the lower end of the teat cup. The joint may be formed by a metal nipple $c$ (Fig. 5) which has ribs or corrugations $c'$ on it, and is divided into two parts by a collar or washer $c^2$. The end $c^3$ of the nipple is pushed into the opening at the bottom of the teat cup, and the rubber tube connection is pushed over its projecting end $c^4$. By using the nipple joint, a simple and efficient junction is made.

The walls of the teat cup are, preferably, made thicker in the body than at the neck part, and, at this part, the interior surface is corrugated, ribbed or otherwise roughened as shown at $g$. One or more (preferably two) grooves $d$ are, or may be, cut or molded in the interior surface of the neck for the purpose of allowing the said neck, when suction is taking place, collapsing or moving inward freely so as to press the cow's teat in a manner similar to hand milking.

The interior surface of the rim $b$, instead of being in line with the interior surface of the neck, may, as shown at Fig. 1 be out of line therewith, for the purpose of allowing the neck to move independently of the rim and vice versa. To effect this, the rubber is so molded or cut that a circular groove or channel $e$, in a horizontal plane, is left between the top of the neck, which latter is rounded off into a shape somewhat similar to that of the tip of the tongue, and forms a lip $i$, and the rim. As the rubber walls are thinner at the bottom of the said groove or channel than at any other part, it follows that, when the neck is drawn inward or compressed during periods of maximum pulsation, the rim does not move to the same extent as the neck, but tends more or less to retain its place and shape. In short, the thin connection $f$, for the neck serves as a hinge for said neck to work or move on. As the rim grips the root of the teat, there is no necessity for causing it to pulsate.

After each compression, which takes place during periods of maximum pulsation, the rubber teat cup, of its own elasticity, expands again, and the sudden expansion draws up some of the warm milk in the pipe connection, and washes it about the cow's teat, so that the teat is kept constantly moist and warm.

The roughened neck serves, in its action, to rub or slightly irritate the teat, and thereby produces the same effect as the papillæ of the tongue of a calf. This action causes the cow to part more freely with its milk.

The teat cups instead of being made of rubber throughout, may be made partly of wood, glass, horn or metal, and partly of rubber or like elastic material.

In the modified form shown at Figs. 3 and 4 the teat cup is made of a slightly tapered or conic shape and the corrugations $g$ almost cover its whole internal surface. As will be seen the rim $b$ is made thicker than that at Fig. 1 and the groove $h$ is narrower.

If desired the teat cups may be made of cylindrical shape or a partly cylindrical and partly conical shape.

If desired three or four channels $d$ may be made in the teat cup.

Having now fully described my invention, what I claim, and desire to secure by Letters Patent, is—

1. A teat cup having a base ring $b$, a bulb portion $a'$, and a reduced neck $a^2$ between them, said reduced neck having grooves extending vertically thereof whereby said reduced neck may collapse, substantially as described.

2. A teat cup having the rim to grip the root of the teat, the internal lip $i$ and the groove $e$ separating the said lip from the rim said lip being adapted to have movement in the interior of the cup independent of the rim, substantially as described.

3. A hollow teat cup, having its internal surface roughened or corrugated and provided with vertical channels and an internal lip, substantially as hereinbefore set forth.

Signed at Glasgow, Scotland, this 9th day of January, A. D. 1894.

ALEXANDER SHIELS.

Witnesses:
H. D. FITZPATRICK,
*Patent Agent.*
WILLIAM GALL.